United States Patent
El-Moussa et al.

(10) Patent No.: US 11,461,460 B2
(45) Date of Patent: Oct. 4, 2022

(54) SOFTWARE CONTAINER APPLICATION ENCRYPTION

(71) Applicant: British Telecommunications Public Limited Company, London (GB)

(72) Inventors: Fadi El-Moussa, London (GB); Ali Sajjad, London (GB)

(73) Assignee: British Telecommunications Public Limited Company, London (GB)

( * ) Notice: Subject to any disclaimer, the term of this patent is extended or adjusted under 35 U.S.C. 154(b) by 83 days.

(21) Appl. No.: 15/733,179

(22) PCT Filed: Dec. 3, 2018

(86) PCT No.: PCT/EP2018/083357
§ 371 (c)(1),
(2) Date: Jun. 4, 2020

(87) PCT Pub. No.: WO2019/110511
PCT Pub. Date: Jun. 13, 2019

(65) Prior Publication Data
US 2020/0387598 A1    Dec. 10, 2020

(30) Foreign Application Priority Data

Dec. 4, 2017  (EP) .................................. 17205249

(51) Int. Cl.
*G06F 21/53* (2013.01)
*G06F 21/60* (2013.01)
(Continued)

(52) U.S. Cl.
CPC ............ *G06F 21/53* (2013.01); *G06F 21/602* (2013.01); *G06F 21/6218* (2013.01);
(Continued)

(58) Field of Classification Search
CPC .... G06F 21/53; G06F 21/602; G06F 21/6218; G06F 2221/033; H04L 9/085; H04L 9/0861
See application file for complete search history.

(56) References Cited

U.S. PATENT DOCUMENTS

2012/0017097 A1 * 1/2012 Walrath .................. G06F 21/78
713/190
2015/0172232 A1 * 6/2015 Creasman ........... H04L 41/0883
709/204
(Continued)

FOREIGN PATENT DOCUMENTS

GB          2550178 A     11/2017

OTHER PUBLICATIONS

Combined Search and Examination Report under Sections 17&18(3) for GB Application No. 1720176.5, dated May 29, 2018, 5 pages.
(Continued)

*Primary Examiner* — Carl G Colin
*Assistant Examiner* — Han Yang
(74) *Attorney, Agent, or Firm* — Patterson Thuente IP

(57) ABSTRACT

A computer implemented method of securing an application executing in a software container deployed in a computer system includes providing access to the application selectively in accordance with access control rules by sharing an encryption key with authorized accessors.

8 Claims, 2 Drawing Sheets

(51) Int. Cl.
*G06F 21/62* (2013.01)
*H04L 9/08* (2006.01)
(52) U.S. Cl.
CPC ............ *H04L 9/085* (2013.01); *H04L 9/0861* (2013.01); *G06F 2221/033* (2013.01)

(56) References Cited

U.S. PATENT DOCUMENTS

| | | | |
|---|---|---|---|
| 2015/0347746 A1* | 12/2015 | Martel | G06F 21/53 726/1 |
| 2017/0024569 A1* | 1/2017 | Xing | G06F 13/28 |
| 2017/0124320 A1 | 5/2017 | Fojtik et al. | |
| 2017/0249472 A1* | 8/2017 | Levy | G06F 21/6218 |
| 2017/0300697 A1 | 10/2017 | Iyer et al. | |
| 2018/0329834 A1* | 11/2018 | Grube | H04L 9/3239 |
| 2019/0156047 A1* | 5/2019 | Daniel | G06F 9/44505 |
| 2019/0171811 A1* | 6/2019 | Daniel | G06N 20/00 |
| 2020/0387599 A1* | 12/2020 | Du | G06N 20/00 |

OTHER PUBLICATIONS

International Search Report and Written Opinion for PCT Application No. PCT/EP2018/083357 dated Jan. 7, 2019, 10 pages.

\* cited by examiner

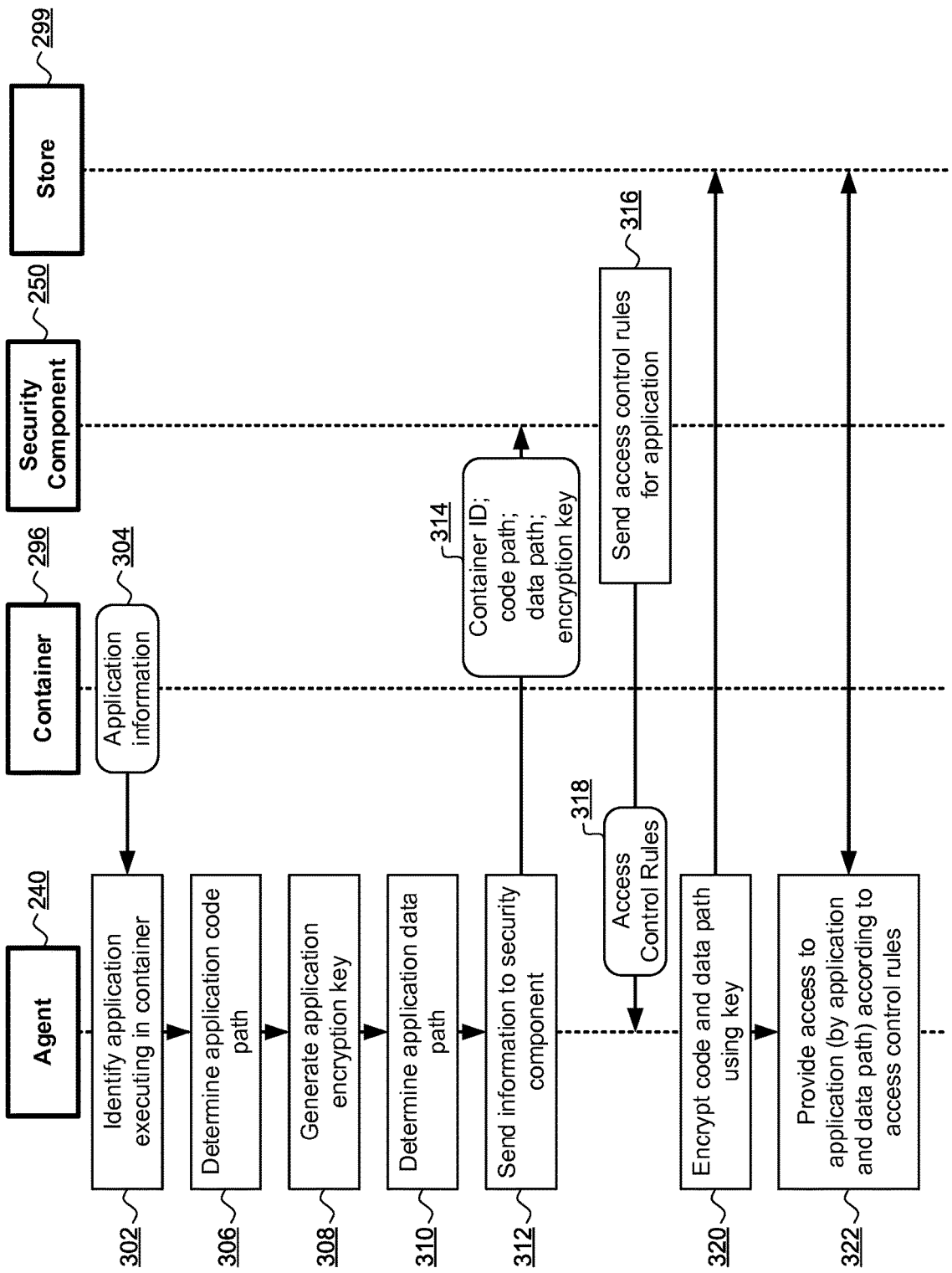

SOFTWARE CONTAINER APPLICATION ENCRYPTION

PRIORITY CLAIM

The present application is a National Phase entry of PCT Application No. PCT/EP2018/083357, filed Dec. 3, 2018, which claims priority from EP Patent Application No. 17205249.0, filed Dec. 4, 2017, each of which is hereby fully incorporated herein by reference.

TECHNICAL FIELD

The present disclosure relates to the security of applications within software containers. In particular, the disclosure relates to encryption for software applications in containers.

BACKGROUND

Software services deployments are increasingly employing operating system functions providing process and namespace isolation. Such isolation allows the containment and execution of application environments in a common base operating system so providing for shared operating system and hardware resources such as kernel, libraries, processor, storage and the like. An example of this approach is the software tool known as "Docker" that employs the Linux operating system-level virtualization "LXC" (Linux Containers) to provide isolated software application containers executing in a base Linux operating system. Each container can include software applications, libraries and other resources and containers can be shared for installation on other computer systems. This approach provides many benefits over traditional machine virtualization which requires the instantiation of complete virtualized computing systems in each virtual machine so duplicating common resources.

Containers are increasingly used to package and distribute standardized applications for execution on potentially disparate configurations of a computer operating system. Containers can contain nested containers each of which can be adapted, replaced or removed and new containers may be added. For example, a web application may be formed in a container having a sub-container of particular operating system libraries required, a sub-container for a standardized image of a database installation (such as MySQL), a sub-container for a standardized image of a web server installation etc. Any reconfiguration of any of these sub-containers will result in a new container. Thus, deployment of applications by container will result in variants of an original container shared between, and installed upon, one or more computer systems.

The variability of the container content introduces new security challenges. In particular, the inability to depend on a standardized size, content, checksum or arrangement of the application container precludes many integrity verification or malicious activity detecting mechanisms. The need to control undesirable behavior such as malicious performance by software is particularly acute where the software executes in a shared computing system with a common operating system kernel, common processor(s), common memory and other common resources. For example, denial of service could arise where one container performs such as to consume resource to the detriment or exclusion of other applications or containers executing in the computer system.

Furthermore, access control for containers and security of applications and data stored in containers can be a priority. Whole container encryption is known but requires that all application and/or data components within the container are encrypted together.

SUMMARY

Thus, it is desirable to provide containerized computer system architectures while alleviating the aforementioned challenges.

The present disclosure accordingly provides, in a first aspect, a computer implemented method of securing an application executing in a software container deployed in a computer system, the method comprising: identifying at least one application executing in the container; determining an application installation path for the application as a location in a container data storage facility at which the code for the application at least partially resides; generating an encryption key for the application; determining an application data path for the application as a location in the container data storage facility at which data processed or generated by the application at least partially resides; securely communicating an identifier of the container, the application installation path, the application data path and the generated encryption key for secure storage by a security component external to the container; securely receiving, from the security component, one or more access control rules defining computing components authorized to access the application; encrypting the application installation path and the application data path using the generated key; and providing access to the application selectively in accordance with the access control rules by sharing the encryption key with authorized accessors.

In some embodiments, the software container is a software process executable in an operating system of a computer system in which operating system software processes are prevented from accessing resources of other second processes executing in the operating system.

In some embodiments the method further comprises: periodically securely receiving updates to the access control rules from the security component, and responsive to receiving updated rules providing access to the application selectively in accordance with the updated rules.

In some embodiments the method further comprises: in response to a restart, redeployment or resumption of execution of the container following a cessation of execution, generating a new key for the application and re-encrypting the application installation path and the application data path using the new key.

In some embodiments the method further comprises securely communicating the new key to the security component.

In some embodiments, the new key is generated based on an exclusive OR operation applied to a combination of the previous key, a time of recommencement of execution of the container and an identifier of the container, and the method further comprising communicating the time of recommencement to the security component so as to permit the security component to separately determine the new key.

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which:

FIG. 3 is a flow diagram of a method for securing the application according to embodiments of the present disclosure.

DETAILED DESCRIPTION OF THE DRAWINGS

Figure 1:
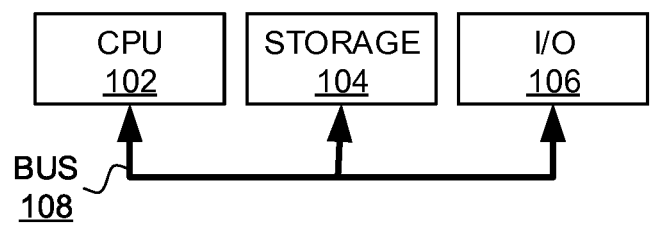
FIG. 1 is a block diagram a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Software applications executing in software containers in computer systems and data associated with such applications are exposed to the threat of unauthorized or malicious access by third parties, other applications, containers, privileged users (such as root users) or other computing components. Container encryption offers some protection but this is at the expense of the flexibility of containers to execute potentially multiple different applications each having different access control provisions. Embodiments of the present disclosure provide application specific encryption and access control such that potentially multiple applications executing in a single deployed software container can be secured differently (using different encryption keys) and, thus, access control can be more granular on a per-application basis.

Figure 2:
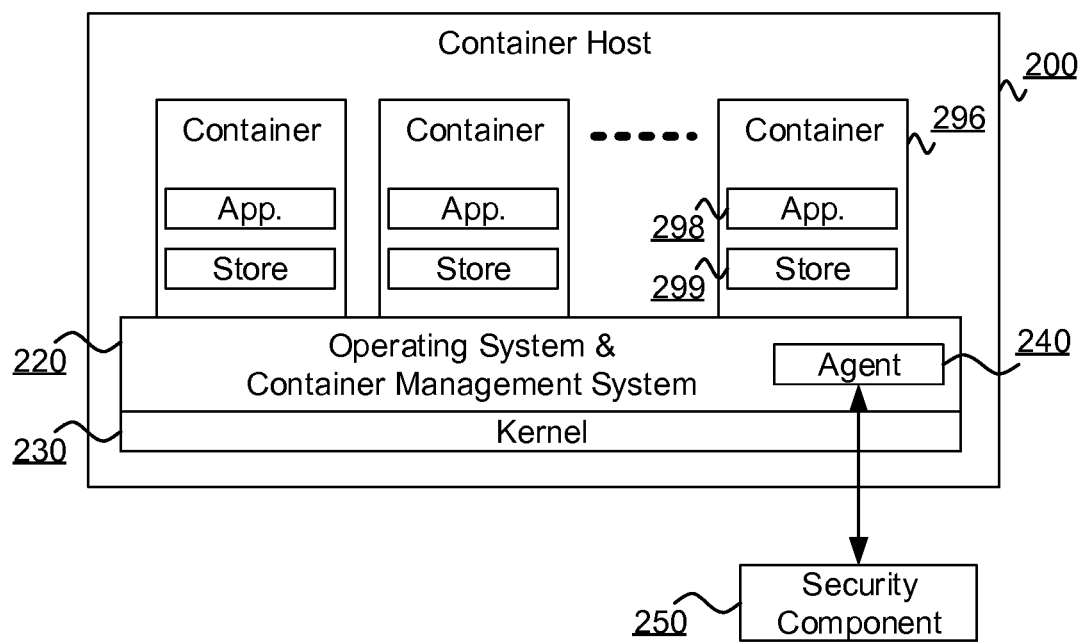
FIG. 2 is a component diagram of an arrangement for securing an application executing in a software container in a computer system according to embodiments of the present disclosure.

FIG. 2 is a component diagram of an arrangement for securing an application executing in a software container in a computer system according to embodiments of the present disclosure. A container host 200 is provided as a computing environment suitable for deployment and execution of software containers. For example, the container host 200 can be a physical, virtual or combination computer system and may be communicatively connected with one or more other computer systems via one or more network connections such as wired or wireless network connections including connections via an intermediate network such as a wide area network or the internet.

The container host 200 includes a kernel providing computing facilities such as access to processing, storage, memory and input/output (I/O) interfaces of a computer system constituting the container host 200. Further, an operating system having, being interfaced with, provided with or operable with a container management system 220 is provided that provides isolation between software processes executing therein such as application container 296. For example, the container host 200 can include a container manager executed at least in part by an operating system 220 for receiving, installing and executing software containers. An example of such a container manager is Docker such as the Docker Engine that includes one or more daemon processes for interface by a Docker client through which the Docker Engine is instructed to retrieve and instantiate software containers. The Docker architecture is described in detail at docs.docker.com and in the document "Understanding the architecture" at "docs.docker.com/engine/understanding-docker". The operating system 220, in conjunction with a container manager, thus provide isolation between software processes such that two processes cannot access each other's resources. Such isolation could take a number of forms, such as namespace isolation, address space isolation or the like. All processes execute in the common operating system and on the common computer system 200 so avoiding duplication and redundancy as can be the case in fully virtualized environments employing, for example, a hypervisor.

Examples of resources that are isolated between processes executing in the operating system and are therefore not accessible between processes include, inter alia: processing resources; storage resource; and input/output resources. For example, resources to which access is prevented between isolated processes can include: threads of execution; tasks executing; memory and/or address space; data stores such as data storage devices; libraries, utilities, functions and procedures; network protocols; network connections and facilities; network ports; stack data structures; heap data structures; peripheral devices; and input/output devices such as displays, user interface devices, printers and the like.

In some embodiments the process isolation provided by the container management system includes namespace isolation where processes or groups of processes are separated such that resources of other processes or groups are not accessible. Such a facility can be combined with, for example, the Linux "cgroups" (control groups) facility for isolating the resource usage of one or more processes. Thus, in use, the computer system 200 executes processes such as application container 296 providing isolation therebetween.

Notably, while the container management system provides isolation between containers as hereinbefore described, containers may still be capable of intercommunication such as by way of network connections or the like between the processes in the same way as unrelated and isolated computer systems can communicated via a network if configured and permitted to do so. Such communication is not necessarily precluded by the operating system. Rather it is the execution environment—the process, task, memory, storage, input/output resources and the like for which isolation is effected.

The instantiation of a software container will now be briefly described. A container definition is received by a container manager for instantiation, installation and/or execution in the container host 200. The container definition is a software component for execution as an isolated process in the operating system 220. For example, the container definition can be a Docker container obtained from a container repository such as the Docker Hub. The container definition can be an image or template from which a container can be instantiated by or with the container manager for execution as one or more processes in the operating system 220. For example, the container definition can include a definition, identification or specification of one or more parts including nested containers, software applications, services, functions, libraries, drivers and the like. For example, a union file system can be employed to provide a single image of an application or process where multiple file system directories corresponding to different applications are represented in a combined form to provide a merged image of multiple parts of a container.

An exemplary instantiated container 296 is illustrated. Once instantiated, the container 296 executes in the operating system 220 of the container host 200 and one or more applications 298 executed therein, enjoying the protections and isolations of the container environment.

The container 296 provides isolated data storage 299 for applications. The data store can be a virtualized storage and is suitable for storing application code and data, such as executable files, libraries, configuration scripts and the like for the application 298, along with data to be processed by or data generated by the application 298.

The operating system 220 further includes an agent 240 as a software component configured to operate in a privileged mode of operation with the operating system 220 and the container management system. The agent 240 is capable of accessing containers instantiated in the container host 200, to read and write to storage of such containers. In some embodiments, the agent 240 is also capable of accessing configuration information for containers so as to identify applications executing or installed therein. In use, the agent 240 determines the applications installed and/or executing in containers of the container host 200 in order to provide security facilities for those applications on a per-application basis, such as encryption and access control.

The agent 240 is operable in communication with a security component 250 as a hardware, software, firmware or combination component arranged to manage access control rules for applications executing in containers within the container host 200. The security component 250 can be a physical or virtualized computing device or a software application executing on such a device. In one embodiment the security component 250 is provided external to the container host 200 such that, for example, the security component 250 may be operated with potentially multiple container hosts. In such embodiments, communication between the security component 250 and the agent 240 can be provided via a network connection, for example. In one embodiment the security component 250 is provided within the container host 200 as, for example, a component or application executing in the operating system 220 or as a function of the kernel 230. In all configurations, communications between the agent 240 and the security component 250 can be secure communications such as encrypted communications.

The arrangement of FIG. 2 will now be considered in use with reference to FIG. 3. FIG. 3 is a flow diagram of a method for securing the application 298 of FIG. 2 according to embodiments of the present invention. Initially, at 302, the agent 240 identifies applications executing in the container 296. This identification can be made based on application information 304 provided by or available from the container 296. Alternatively, the identification can be made by the agent 240 proactively monitoring, scanning, searching or processing the container 296 or configuration information for the container 296 such as by accessing the store 299 of the container, one or more registries of the container 299, a process list of the container 299 or the like. Subsequently, at 306, an application code path for the application is determined. The application code path is a location in the store 299 of the container 296 at which the application code is at least partially stored, such as application executable files, scripts, libraries, configuration files and the like. The location of the application code path can be determined, for example, either with reference to application or container configuration information or by scanning the store 299 of the container 296. At 308 the agent 240 generates an encryption key specific to the application 298. At 310 the agent 240 determines an application data path for the application 298 as a location in the container store 299 at which data processed or generated by the application 296 is at least partially stored. The location of the application data path can be identified using techniques similar to that for the application code path.

At 312 the agent 240 securely communicates an identifier of the container 296, the application code path, the application data path and the generated encryption key to the security component 250. On the basis of the information supplied, the security component 250 securely communicates one or more access control rules 318 for the application 298 to the agent 240 at 316. The access control rules define entities such as software, hardware, firmware, combination components or, indeed, users, computer systems, containers, applications and the like that are authorized and/or not authorized to access the application 298 in the container 296. Such rules can be determined based on a profile, such as a security profile, defined for any of the application 298, container 296, or container host 200. For example, such rules can be defined by an operator of the security component 250.

At 320 the agent 240 encrypts the application using the generated key. The application is encrypted by encrypting the data stored at the application code path and the data stored at the application data path. In this way access to the application (both code and data) is protected. Subsequently, at 322, the agent 240 provides access control for the application 298 in the container 296 by providing or precluding access by requesting entities based on the access control rules.

In some embodiments, the agent 240 is further responsive to periodically securely receive updates to the access control rules from the security component, such updates being reflected by the agent 240 and effected in its provision of the access control service.

Where execution of the container is interrupted or ceases, such as by the container being actively or incidentally terminated, a restart, redeployment or other resumption of execution of the container will ensue. In one embodiment, such an occurrence results in the generation of a new encryption key for the application by the agent 240 and a re-encryption of the application (both the code and application data paths) using the new key. Accordingly, in such embodiments, the new key can be securely communicated to the security component 250. Alternatively, the new key can be generated based on the former key, such as by an exclusive or operation of each of: the former key; an identifier of the container 296; and a time of the resumption of the container execution. In such an embodiments there may be no need to communicate the new key to the security component but instead only to communicate the time of resumption in order that the security component can determine the new key independently.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the invention. The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of securing an application executing in a software container deployed in a computer system, the method comprising:
   securely transmitting an identifier of the software container, the application installation path, the application data path and the generated encryption key to a security component external to the software container for secure storage;
   securely receiving, from the security component, one or more access control rules defining computing components authorized to access the application;
   encrypting the application installation path and the application data path using the generated encryption key; and
   providing access to the application selectively in accordance with the access control rules by sharing the generated encryption key with authorized accessors.

2. The computer implemented method of claim 1, wherein the software container is a software process executable in an operating system of the computer system in which operating system software processes are prevented from accessing resources of other second processes executing in the operating system.

3. The computer implemented method of claim 1, further comprising:
   periodically securely receiving updates to the access control rules from the security component; and
   responsive to receiving updated rules, providing access to the application selectively in accordance with the updated access control rules.

4. The computer implemented method of claim 1, further comprising:
   in response to a restart, a redeployment or resumption of execution of the software container following a cessation of execution, generating a new encryption key for the application and re-encrypting the application installation path and the application data path using the new encryption key.

5. The computer implemented method of claim 4, further comprising securely transmitting the new encryption key to the security component.

6. The computer implemented method of claim 4, wherein the new encryption key is generated based on an exclusive OR operation applied to a combination of previous key, a time of recommencement of execution of the software container and the identifier of the software container, and the method further comprising transmitting the time of recommencement to the security component so as to permit the security component to separately determine the new encryption key.

7. A non-transitory computer readable storage element comprising computer program code to, when loaded into a computer system and executed thereon, cause the computer system to perform the computer implemented method as claimed in claim 1.

8. A system comprising:
   a processor and memory storing computer program code for securing an application executing in a software container deployed in a computer system, by:
      identifying at least one application executing in the software container;
      determining an application installation path for the application as a location in a container data storage facility at which code for the application at least partially resides;
      generating an encryption key for the application;
      determining an application data path for the application as a location in the container data storage facility at which data processed or generated by the application at least partially resides;
      securely transmitting an identifier of the software container, the application installation path, the application data path and the generated encryption key to a security component external to the software container for secure storage;
      securely receiving, from the security component, one or more access control rules defining computing components authorized to access the application;
      encrypting the application installation path and the application data path using the generated encryption key; and
      providing access to the application selectively in accordance with the access control rules by sharing the generated encryption key with authorized accessors.

* * * * *